United States Patent [19]

Loge

[11] Patent Number: 5,705,872
[45] Date of Patent: Jan. 6, 1998

[54] BRUSHLESS RESOLVER

[75] Inventor: Hans Loge, Neukeferloh, Germany

[73] Assignee: Siemens Aktiengesellschaft, Munich, Germany

[21] Appl. No.: 679,808

[22] Filed: Jul. 15, 1996

[30] Foreign Application Priority Data

Jul. 25, 1995 [DE] Germany ............... 195 27 156.4

[51] Int. Cl.$^6$ ............................................. H02K 24/00
[52] U.S. Cl. ...................... 310/161; 310/171; 310/211; 318/813; 318/809
[58] Field of Search ........................ 310/161, 171, 310/211, 160; 318/813, 809, 605; 73/514.31, 514.39

[56] References Cited

FOREIGN PATENT DOCUMENTS 0 593 351 A1  4/1994  European Pat. Off. .

Primary Examiner—Clayton E. LaBalle
Assistant Examiner—Timothy A. J. Williams
Attorney, Agent, or Firm—Hill, Steadman & Simpson

[57] ABSTRACT

A brushless resolver having a stator and a rotor, and a resolver part axially displaced to one another and a transformer part and having associated windings is provided. An additional short-circuited winding arranged parallel with the transformer rotor winding with few turns on the iron core thereof is also provided. A lowpass filter is thereby formed, which compensates the unwanted frequency-dependent phase displacement between the input voltage and the output voltages for the respective frequency.

7 Claims, 2 Drawing Sheets $U_{sin} = t \cdot U_0 \cdot \sin \alpha$ $U_{cos} = t \cdot U_0 \cdot \cos \alpha$

BRUSHLESS RESOLVER

BACKGROUND OF THE INVENTION

1. Field of the Invention

The present invention relates generally to a brushless resolver having a stator and a rotor. More specifically, a resolver part having at least two stator windings and one rotor winding is arranged on the brushless resolver. A transformer part is displaced axially to the resolver part. The transformer has a transformer stator winding and a transformer rotor winding. The rotor has an additional short-circuited winding.

2. Description of the Related Art

Brushless resolvers are inductive components that consist of two transformer arrangements, namely the actual resolver part and the transformer part. In the resolver part, the mechanical angle of rotation between the stator and the rotor is calculated through measurement of the output voltages as angle functions sine and cosine. The transformer part provides the contactless transmission of the input voltage to the rotor. Due to the transformer design, resolvers must be operated with alternating voltage. Their transmission behavior is dependent on the frequency of the excitation voltage.

While the transformation behavior in a determined frequency region remains almost constant, the phase between the output voltages and the input voltage displaces itself very strongly depending on the frequency. The frequency response of the phase displacement has a largely monotonically falling curve from low frequencies to higher frequencies, with a zero crossing in the upper part of the standard operating region. Since a rectification of the resolver signals must occur during the evaluation of these signals, taking into account their phase relation to the excitation signal. If they are in phase, this corresponds to positive values, while if they are in phase opposition, this corresponds to negative values. As a rule, the evaluation electronics can tolerate only small additional phase displacements. The phase displacement presents a problem particularly if resolvers are to be operated at low frequencies.

Previously, this phase displacement problem has been solved by the generating a phase-corrected reference signal for the evaluation electronics from the excitation voltage using an RC element. The replacement of a resolver in a particular application having predetermined evaluation electronics by a resolver having a different phase displacement requires that the phase correction element of the evaluation electronics must be modified.

From EP 0 593 351 A1, a resolver arrangement is known in which a short-circuited winding in the form of a disc or a ring on the stator or the rotor is spatially arranged in the area between the resolver part and the transformer part, in order to screen the stray flux of the transformer part from the resolver part. However, this measure has no influence on the phase displacement between the input voltage and the output voltages.

SUMMARY OF THE INVENTION

An object of the present invention is to provide a brushless resolver to enable a compensation of the phase displacement in the resolver itself through a simple measure, which can be incorporated in the manufacture of the resolver without great expense, thereby making an external phase correction in the evaluation electronics superfluous.

According to the present invention, this object is achieved in a resolver having the construction named above wherein the short-circuited winding is arranged as a wire winding parallel to the transformer rotor winding on the iron core thereof. The number of turns and wire diameter of the short-circuited winding are chosen so that the lowpass filter formed at least partially compensates the phase displacement of the resolver at least partially at the operating frequency.

The power consumption of the short-circuited winding, with its impedance L and its resistance R, has the effect of a first-order lowpass filter on the transmission function of the resolver. The corner frequency, and thereby the effect of this lowpass filter on the phase displacement, can be optimally modified by varying the number of turns (modification of L and R) or by varying the wire cross-section (modification of R).

However, the transformation relation is also reduced through the lowpass filter behavior. However, this can be compensated through modification of the relations of the number of turns, without thereby essentially influencing the phase displacement. The frequency response of the transmission relation, however, loses its range with an approximately constant curve. For this reason, phase-corrected resolvers are suited only for a limited frequency region.

The short-circuited winding of the present invention can be constructed with the same wire thickness as the transformer rotor winding. Other wire thicknesses can also be used corresponding to the desired phase displacement. The number of turns of the short-circuited winding is greater the 1, but considerably smaller than the number of turns of the transformer rotor winding. In the standard construction of resolvers, the numbers of turns used range approximately from 5 to 10% of the transformer rotor winding.

The present invention is explained in more detail below by means of exemplary embodiments in view of the drawings.

DETAILED DESCRIPTION OF THE PREFERRED EMBODIMENT

Figure 1:
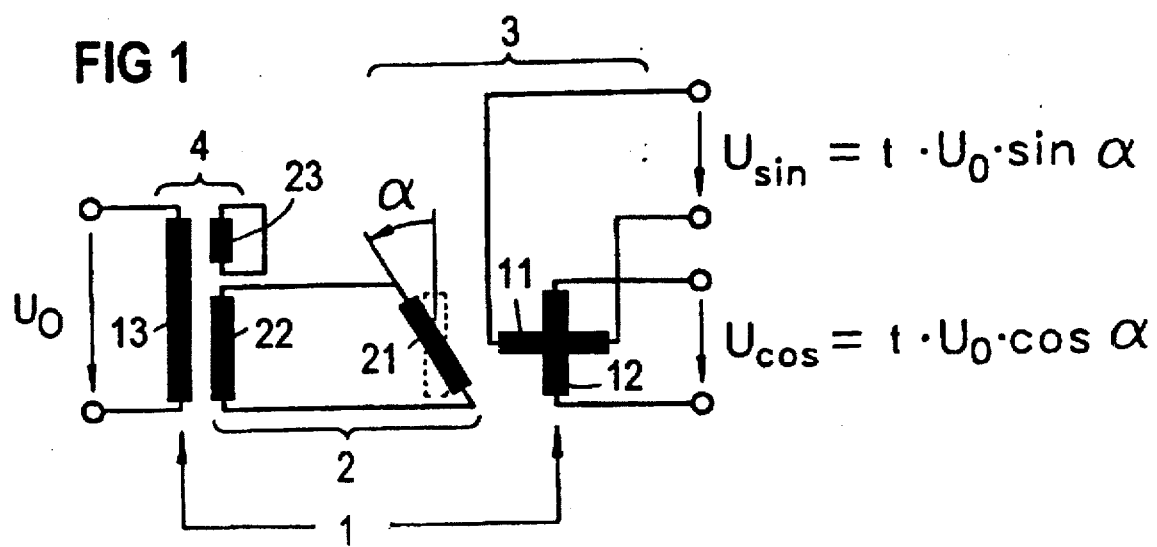
FIG. 1 is a schematic diagram of an embodiment of a resolver having a short-circuited winding of the present invention.

The resolver shown in the schematic diagram in FIG. 1 has a stator 1 with two stator windings 11 and 12, arranged at a displacement of 90° to one another, as well as a transformer stator winding 13, arranged so as to be axially displaced thereto. A rotor 2, arranged in the stator 1 to be coaxially rotatable, has a resolver rotor winding 21 and a transformer rotor winding 22. The stator windings 11 and 12, and the rotor winding 21, form a resolver part 3 of the resolver, while the windings arranged axially displaced thereto, namely the transformer stator winding 13 and the transformer rotor winding 22, form a transformer part 4.

The construction specified above corresponds to generally known resolver design. An input voltage $U_0$ is applied to the transformer stator winding 13. Via the associated transformer rotor winding 22, this voltage is applied to the resolver rotor winding 21, which induces corresponding output voltages in the resolver stator windings 11 and 12. An output voltage $U_{sin}$ is thus picked off at the stator winding 11, and an output voltage $U_{cos}$ is picked off at the stator winding 12. These output voltages depend on an angular position $\alpha$ of the rotor winding 21, according to the following equations:

$$U_{sin} = t \cdot U_0 \cdot \sin \alpha$$

$$U_{cos} = t \cdot U_0 \cdot \cos \alpha$$

The factor t designates the transformation relation of the resolver; this is the relation between the maximum value of the output voltages to the maximum value of the input voltage. The angle of rotation $\alpha$ of the rotor can thus be derived from the measured output voltages $U_{sin}$ and $U_{cos}$.

In order to compensate the phase displacement between the output voltages and the input voltage, which displacement is dependent on the operating frequency, in the transformer part 4, a short-circuited winding 23 having few turns is additionally attached, parallel to the transformer rotor winding 22. This winding functions with its impedance L and its resistance R as a lowpass filter. Given a corresponding dimensioning of the number of turns and the wire cross-section, the winding compensates the undesired phase displacement.

Figure 2:
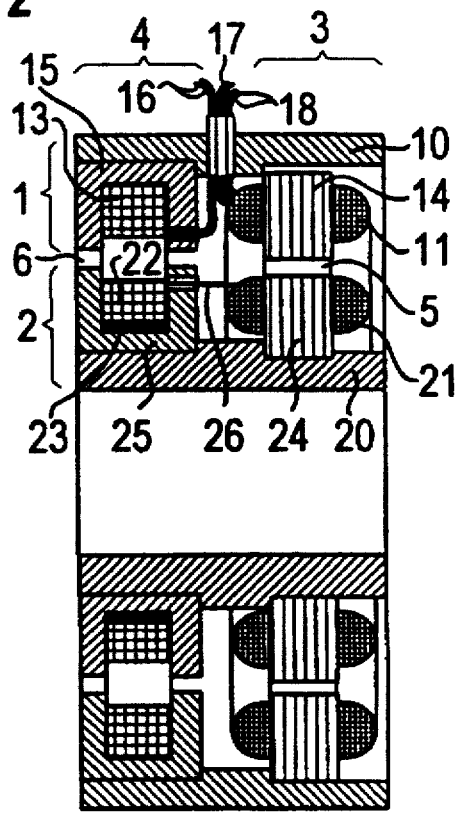
FIG. 2 is a schematic sectional view of the mechanical construction of an embodiment of a resolver of the present invention.

In FIG. 2, the mechanical construction of the resolver according to FIG. 1 is shown partly schematically in section. A rotor shaft 20 is seated in a housing 10, in a manner not shown. In the present example, there is a hollow shaft that can be attached to a machine shaft whose angle of rotation is to be measured. The housing 10 forms, with the windings 11, 12 and 13 arranged in it, the stator 1. The rotor shaft 20, with the windings 21, 22 and 23, forms the rotor 2. As already mentioned, the windings are axially displaced, whereby the stator windings 11 and the winding 12 (not shown) are arranged in a layered iron core 14 so as to be displaced by 90° from the resolver part 3, while the rotor winding 21 is likewise arranged on an iron core 24. The iron cores 14 and 24 are positioned opposite one another so as to form an air gap 5.

The transformer part 4 is arranged with an axial displacement to the resolver part 3. The transformer part 4 also has an iron core 15 (e.g. bipartite) on the stator, in which the transformer stator winding 13 is arranged. The transformer part of the rotor 4 bears an iron core 25, on which the transformer rotor winding 22 is arranged. In addition, this iron core (underneath the rotor winding 22 in the present example) bears the additional short-circuited winding 23. The iron cores 15 and 25 likewise form an air gap 6. The housing 10 and the rotor shaft 20 are made for example from a non-magnetic metal, such as high-grade steel. In addition, the connecting leads, namely a pair of leads 16 for the supply of the input voltage $U_0$ and two pairs of leads 17 and 18 for picking off the output voltages at the stator windings 11 and 12, are led through the housing 10. In the interior, the secondary voltage of the transformer part is conducted via a lead 26 from the transformer rotor winding 22 to the resolver rotor winding 21.

Figure 3:
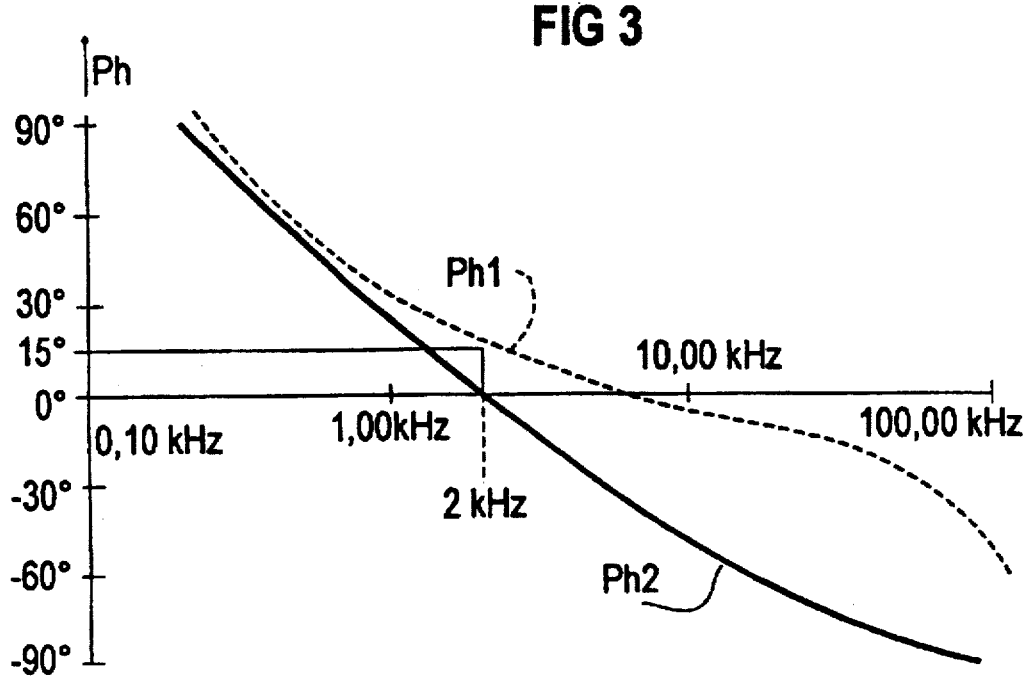
FIG. 3 is a graphical diagram illustrating a typical curve of the frequency-dependent phase displacement of a resolver without a short-circuited winding, and a curve representing the phase displacement of the resolver of the present invention.

FIG. 3 shows a typical curve of the phase displacement of a resolver. The dotted line Ph1 shows the curve of the phase displacement without the short-circuited winding. It can be seen that this phase displacement has a zero crossing at a frequency of approximately 5 kHz. Thus, at this frequency practically no phase displacement occurs, while as the frequency decreases, a positive phase displacement occurs, and as the frequency increases, an increasing negative phase displacement occurs.

By means of the short-circuited winding with lowpass effect of the present invention, the curve is displaced, so that, at an assumed particular dimensioning of the short-circuited winding, the curve shown by the solid line Ph2 is achieved. This curve then has a zero crossing at about 2 kHz. Thus, if the operating frequency of the resolver is 2 kHz, the originally present phase displacement is compensated by the short-circuited winding from about 15° to approximately 0°.

Figure 4:
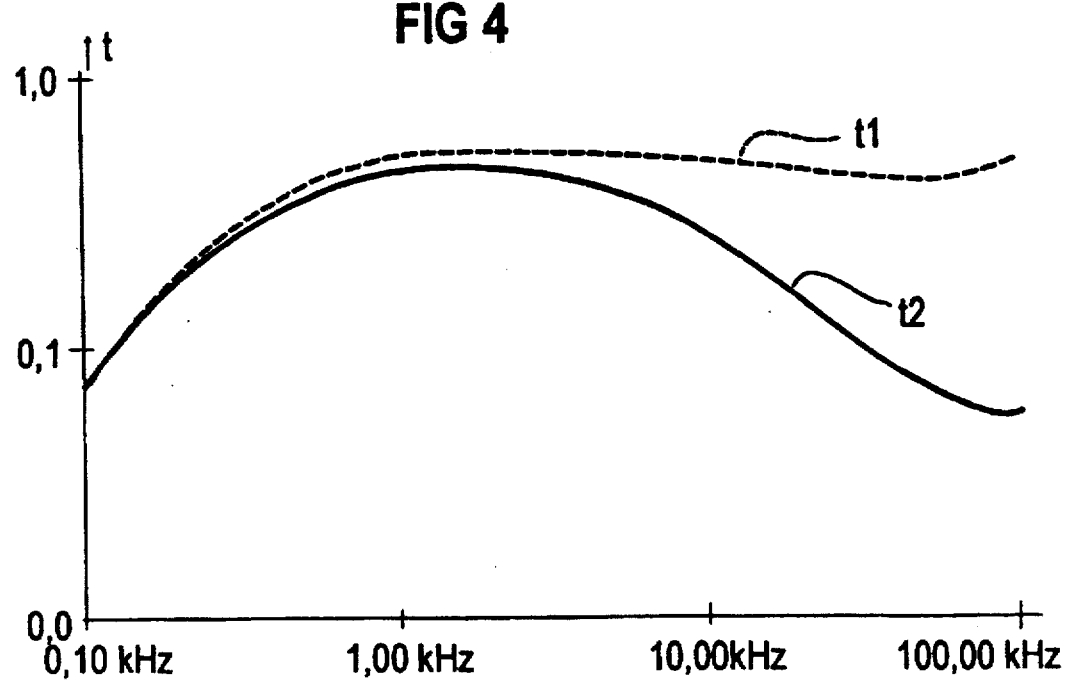
FIG. 4 is a graphical diagram illustrating the curve of the transformer relation of a resolver of the present invention depending on the operating frequency.

FIG. 4 shows the frequency response of the transformer relation. The dotted curve t1 shows the relation without the short-circuited winding. According to it, in a certain frequency region, i.e. approximately above 1 kHz, the frequency response of the transformation relation runs at a nearly constant value, the specified transformation relation. This frequency region is the standard operating region of a resolver. However, the transformation relation is reduced by the lowpass filter behavior of the short-circuited winding of the present invention. The solid curve t2 is then valid, which maintains the maximum transformation relation only in a very short region. The resolver can thus be operated with the compensating short-circuited winding only in a relatively narrow frequency region. This however may not be disadvantageous, since the resolver was compensated in the phase displacement for a particular frequency.

A few practical dimensioning examples of the present invention are provided below.

Example 1

A six-pole hollow-shaft resolver of size 21, having an operating frequency of 3.3 kHz and a transformer rotor winding with 200 turns, was provided with various short-circuited windings. Table 1 lists the following different phase displacements Ph and different transformation relations t that result.

TABLE 1

| Number of turns | Wire cross-section | Phase displacement | Transformation relation t |
|---|---|---|---|
| Without short-circuited winding | — | +31° | — |
| 6 | 0.0254 m² | +21° | −10% |
| 6 | 0.0508 m² | +14° | −21% |
| 12 | 0.0254 m² | +10° | −24% |
| 12 | 0.0508 m² | −2° | −43% |

As can be seen from Table 1, the phase displacement with 12 turns of wire having a 0.0254 mm² cross-section was compensated to +10°, and with 12 turns and a wire cross-section of 0.0508 mm² was overcompensated to −2°. The modified transformation relation t can then be additionally compensated through a modification of the remaining number of turns.

Example 2

A two-pole hollow shaft resolver of size 15, having a transformer rotor winding of 180 turns and an operating frequency of 3.4 kHz was provided with a short-circuited winding. The transformation relation was held constant through matching of the transformer rotor winding. The following values resulted. Without a short-circuited winding, the phase displacement was +26°. With the short-circuited winding having 18 turns, given a wire diameter of 0.125 mm (which corresponds to the wire of the rotor winding), a reduction of the phase displacement to +5° resulted, which is sufficient for most applications.

It should short-circuited understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A brushless resolver having a stator and a rotor, comprising:

a resolver part having at least two stator windings and at least one rotor winding arranged on the stator and rotor;

a transformer part displaced axially relative to the resolver part, the transformer part having a transformer stator winding and a transformer rotor winding, each having a number of turns; and a short-circuited winding arranged in the rotor as a wire winding parallel to the transformer rotor winding on an iron core thereof, wherein the short-circuited winding has a number of turns and a wire diameter selected so as to form a lowpass filter to compensate the phase displacement of the resolver at the operating frequency.

2. The resolver according to claim 1, wherein the number of turns of the short-circuited winding is more than 1 and less than ¼ of the number of turns of the transformer rotor winding.

3. The resolver according to claim 2, wherein the diameter and the number of turns of the short-circuited winding compensate the phase displacement up to a remainder between 0° and 10°.

4. The resolver according to claim 1, wherein the short-circuited winding has a diameter and number of turns to compensate the phase displacement up to between 0° and 10°.

5. The resolver according to claim 1, wherein the short-circuited winding has a wire thickness equal to that of the transformer rotor winding.

6. The resolver according to claim 1, wherein a transformation relation is held relatively constant through matching of the numbers of turns of the transformer part.

7. The brushless resolver according to claim 6, wherein the short-circuited winding comprises means for compensating the phase displacement at an operating frequency so that the transformation relation has a relative maximum.

* * * * *